United States Patent Office 3,732,220
Patented May 8, 1973

3,732,220
CHLORO-N,N-DISUBSTITUTED AMINO METHYL-
ENE AMINO-s-TRIAZINES
John B. O'Brien, Morris Plains, Herman Stone, Morristown, and Harry E. Ulmer, Convent Station, N.J., assignors to Allied Chemical Corporation, New York, N.Y.
No Drawing. Filed Oct. 16, 1970, Ser. No. 81,620
Int. Cl. C07d 55/20
U.S. Cl. 260—249.8        3 Claims

ABSTRACT OF THE DISCLOSURE

Triazines of the structure

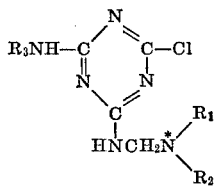

wherein $R_1$ is a $C_1$ to $C_4$ alkane, phenyl or benzyl, $R_2$ is independently hydrogen, a $C_1$ to $C_4$ alkane, phenyl or benzyl, or $R_1$ and $R_2$ together with the $\overset{*}{N}$ form a $C_4$ or $C_5$ heterocyclic ring and wherein $R_3$ is a $C_1$ to $C_4$ aliphatic hydrocarbon, are highly selective and effective herbicides.

BACKGROUND OF THE INVENTION

This invention relates to triazines which have utility as selective herbicides.

Over the past few years a large number of chemical herbicides have been placed on the market, but despite the increasing number of herbicides, there remain problems for which none or few herbicides are appropriate. For example, nonselective herbicides are available which, when applied postemergence, will produce high kills of all vegetation; selective herbicides are available which will attack dicotyledonous or monocotyledonous plants but which also cause a high degree of crop injury. There are very few compounds available which are so selective that they will attack all forms of vegetation with the exception of one crop and accordingly, there is a great need in the art for such a herbicide.

Many triazine herbicides are known to the prior art, including the widely used atrazine:

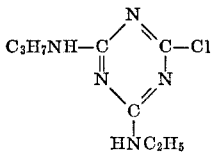

See also U.S. Pat. 3,494,759 and copending commonly assigned applications Ser. No. 757,456, now U.S. Pat. No. 3,595,639, and 759,798.

However, as heretofore indicated, the known prior art triazine derived herbicides are sometimes insufficiently selective.

It has been found in accordance with the instant invention that triazines of the structure

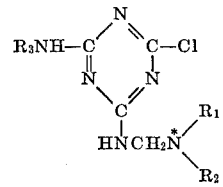

wherein $R_1$ is a $C_1$ to $C_4$ alkane, phenyl or benzyl, $R_2$ is independently hydrogen, a $C_1$ to $C_4$ alkane, phenyl or benzyl, or $R_1$ and $R_2$ together with the $\overset{*}{N}$ form a $C_4$ or $C_5$ heterocyclic ring and wherein $R_3$ is a $C_1$ to $C_4$ aliphatic hydrocarbon, are highly selective and effective herbicides.

Particularly preferred triazines of the instant invention are those wherein $R_3$ is an isopropyl group and $R_1$ and $R_2$ are both isobutyl or together with the $\overset{*}{N}$ form a $C_5$ heterocyclic piperidine ring. These two preferred compounds thus have the structures

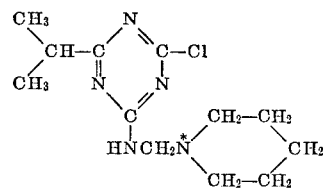

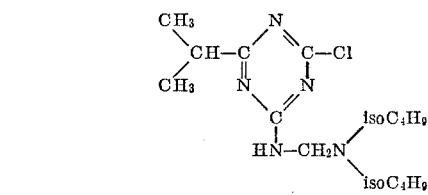

The triazines of the instant invention are prepared by reacting a 2-alkylamino-4-amino-6-chloro-s-triazine with formaldehyde and a secondary amine in the presence of base. The reaction may be represented as follows with the positions of the triazine ring appropriately numbered.

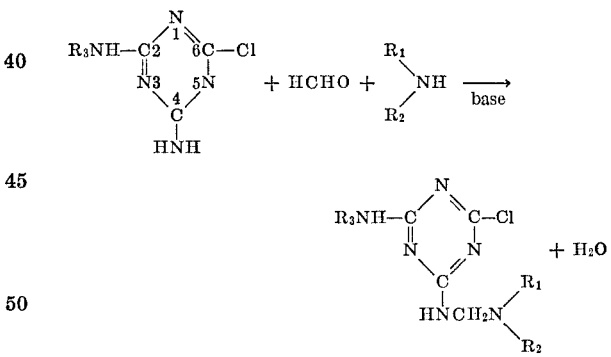

Approximately equal amounts of the s-triazine, formaldehyde and secondary amine are reacted together. The reaction is most suitably effected in an organic solvent inert under the reaction conditions such as for example, benzene, toluene, xylene, cumene, chloroform, or carbon tetrachloride. Suitable bases include alkali or alkaline earth metal hydroxides or tertiary alkyl amines such as trimethyl or triethyl amine. Although formaldehyde gas can be utilized, preferably the formaldehyde is added in the form of paraformaldehyde.

Normally the reaction mixture will be agitated at temperatures of about 25–85° C. and atmospheric pressure, although higher temperatures and pressures may be employed if desired. A reaction time of 1–24 hours is normally sufficient. After completion of the reaction, the reaction mixture is ordinarily dried filtered and the solvent removed under reduced pressure to afford the product as a solid residue. The product can be purified by trituration with or recrystallization from solvents such as a $C_1$ to $C_3$ alcohol or dialkyl ether.

The 2-alkylamino-4-amino-6-chloro-s-triazines utilized in the preparation of the triazines of the instant invention can be synthesized by means taught in the art, for example, Pearlman and Banks, J. Am. Chem. Soc., 70, 3726 (1948).

When $R_3$ is isopropyl and the secondary amine is either di-isobutylamine or piperidine, the particularly preferred triazine herbicides of the instant invention are produced.

The instant compounds have been found to be unexpectedly effective herbicides in that they are very harmful to all forms of grass and broadleafed weeds, while being harmless toward food-crop plants such as corn and sorghum.

Normally, the instant compounds will be used as the active ingredient in a herbicidal composition, including a carrier, although they can also be used without a carrier. Various diluents and carriers can be employed and the percent of active ingredient present in a herbicidal formulation can be varied over a wide range. Although compositions with less than about .25% by weight of active ingredient can be used, it is preferable to use compositions containing at least about .50% of active ingredient because otherwise the amount of carrier becomes excessively large. Activity increases with the concentration of active ingredient, which can, of course, be 10, 50, 95% or even higher.

The amount of composition which is applied for effective herbicidal action is dependent upon considerations such as the concentration of active ingredient, type of undesirable plant to be killed, the density of undesirable plants, and soil and climatic conditions. Preferably, sufficient composition will be applied to provide about 1 to 10 pounds of active ingredient per acre.

The herbicidal compositions of the instant invention can be in the form of a solution, with the solvent being acetone, methanol and the like. These solutions can be applied to the plants in a direct manner such as by spraying, sprinkling, drenching, etc. Aqueous dispersions of the triazines of the instant invention can also be applied in this manner.

Application can also be achieved by dusting a powder in which the active ingredient is dispersed. Suitable carriers include finely powdered material such as clay, fuller's earth and talc.

The triazine compounds of the instant invention can constitute the sole active ingredient in a herbicidal composition, but they can also be effectively used in combination with other biologically active ingredients such as other herbicides, phytocides, insecticides, or other plant treating agents.

Inasmuch as the compounds of the instant invention are only sparingly soluble in water, it is often convenient to utilize them in the form of their water-soluble salts, for example, as the hydrochloride salt.

The invention can be more fully understood by reference to the following examples. All parts are parts by weight unless otherwise expressly noted.

EXAMPLE 1

Paraformaldehyde (10.8 parts), piperidine (29.2 parts), and powdered sodium hydroxide (10 parts) were added with stirring to a solution of 2-isopropylamino-4-amino-6-chloro-s-triazine (64.4 parts) in chloroform (Ca 800 parts). The reaction mixture was then heated to 60° C. and stirred at this temperature for 6 hours. Aliquots of the reaction mixture were periodically removed during this 6 hour period and analyzed for the presence of starting material by thin layer chromatography. After 6 hours, no starting material was present. The clear reaction solution was allowed to cool to room temperature and then extracted several times with water and then dried with magnesium sulfate, filtered, and the solvent removed at reduced pressure. The residue was purified by trituration with ethyl ether affording the desired product, M.P. 154°–155° C. in about 85% yield. Infrared, mass spectrographic, and NMR analysis of the product indicated its structure to be

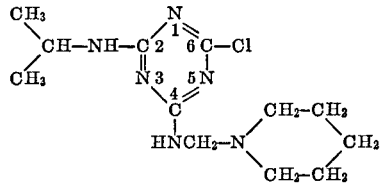

i.e. 2 - isopropylamino-4-piperidinomethylamino-6-chloro-s-triazine.

EXAMPLE 2

The procedure of Example 1 was repeated, except di-isobutyl amine was utilized instead of piperidine. The product had a M.P. of 142°–143° C. Analysis indicated it to be 2-isopropylamino-4-di-sec-butylaminomethylamino-6-chloro-s-triazine.

EXAMPLE 3

Utilizing the procedure of Example 1, the following triazines were prepared. In all cases, $R_3$ was isopropyl. All of these triazines were found to be effective selective herbicides.

| $R_1$ | $R_2$ |
|---|---|
| —(CH$_2$)$_4$—(pyrrolidine ring) | |
| —(CH$_2$)$_2$O(CH$_2$)$_2$—(morpholine ring) | |
| —CH$_3$ | —CH$_3$ |
| —C$_2$H$_5$ | —C$_2$H$_5$ |
| —nC$_4$H$_9$ | —nC$_4$H$_9$ |
| iso—C$_4$H$_9$ | iso—C$_4$H$_9$ |
| C$_6$H$_5$ | C$_6$H$_5$ |
| nC$_3$H$_7$ | nC$_3$H$_7$ |
| iso—C$_3$H$_7$ | iso—C$_3$H$_7$ |
| —CH$_2$C$_6$H$_5$ | —CH$_2$C$_6$H$_5$ |
| iso—C$_3$H$_7$ | H |

EXAMPLE 4

Using the procedure of Example 1, a series of 2-alkylamino - 4 - di - sec - butylaminoethyl - amino - 6 - chloro-5-triazines was prepared wherein the 2-alkylamino groups were respectively methyl, ethyl, and n-butylamino. $R_1$ and $R_2$ were both sec. butyl. In all instances, the triazines were effective selective herbicides.

EXAMPLE 5

Herbicidal activity

The following crop species and weed species were planted in metal flats (12 x 8.5 x 4 inches) in greenhouse potting soil containing one-third mixed clay and sand, one-third mushroom soil, and one-third peat moss. The pH of the soil was 6.8–7.2.

Crop species: Corn, *Zea mays*
Weed species:
  Mustard
  Yellow foxtail
  Crabgrass
  Buckwheat
  Morning Glory
  Yellow nutsedge
  Wild oats
  Jimson weed
  Velvet leaf
  Johnson grass from seedlings
  Pig weed
  Barnyard grass Each flat received a volume of spray equal to 50 gallons per acre of an acetone solution of 2-isopropylamino-4-di-sec-butylaminomethylamino - 6 - chloro - s - triazine. The concentration of the solution was adjusted to provide application of 1, 2, 5, and 10 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in preemergence tests, and 8-10 days after seeding in the post-emergence tests. Results were observed 13 days after spraying in post emergence tests and after 20 days in preemergence tests.

The effect of the herbicide was evaluated in terms of the injury rating index scale, ranging from 0 to 10 as follows:

0—No apparent injury
1,2,3—Slight injury
4,5,6—Moderate injury
7,8,9—Severe injury (plants will die)
10—Plants were dead An injury rating of 3 is the maximum tolerated for crops and a rating of 7 is the minimum acceptable on weed plants.

| | Injury rating | | | | | | |
|---|---|---|---|---|---|---|---|
| | Preemergence | | | | Postemergence | | |
| Plant | (1) | (2) | (3) | (4) | (1) | (2) | (3) |
| Corn | 0 | 0 | 0 | 0 | 0 | 0 | 0 |
| Mustard | 10 | 10 | 10 | 10 | 10 | 10 | 10 |
| Yellow foxtail | 10 | 10 | 10 | 9 | 10 | 9 | 7 |
| Crabgrass | 10 | 10 | 10 | 8 | 7 | 10 | 5 |
| Buckwheat | 10 | 10 | 10 | 10 | 10 | 10 | 10 |
| Morning glory | 10 | 10 | 10 | 10 | 10 | 9 | 9 |
| Barnyard grass | 10 | 10 | 9 | 2 | 10 | 4 | 2 |
| Yellow nutsedge | 10 | 8 | 6 | 1 | 10 | 3 | 0 |
| Wild oats | 10 | 10 | 10 | 9 | 10 | 10 | 10 |
| Jimson weed | 10 | 10 | 10 | 9 | 10 | 10 | 10 |
| Velvet leaf | 10 | 10 | 10 | 5 | 10 | 10 | 5 |
| Johnson grass | 10 | 2 | 0 | 0 | 5 | 0 | 0 |
| Pig weed | 10 | 10 | 10 | 10 | | | |

[1] 10 pounds of active ingredient per acre.
[2] 5 pounds of active ingredient per acre.
[3] 2 pounds of active ingredient per acre.
[4] 1 pound of active ingredient per acre.

EXAMPLE 6

Herbicidal activity

The following crop species and weed species were planted in metal flats (12 x 8.5 x 4 inches) in greenhouse potting soil containing one-third mixed clay and sand, one-third mushroom soil, and one-third peat moss. The pH of the soil was 6.8-7.2.

Crop species: Corn, *Zea mays*
Weed species:
    Mustard
    Yellow foxtail
    Crabgrass
    Buckwheat
    Morning Glory
    Yellow nutsedge
    Barnyard grass Each flat received a volume of spray equal to 50 gallons per acre of an acetone solution of 2-isopropylamino-4-piperidinomethylamino-6-chloro-s-triazine. The concentration of the solution was adjusted to provide application of 1.25, 2.5, 5, and 10 pounds of active ingredient per acre. Immediately after spraying, the test facts were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in preemergence tests, and 8-10 days after seeding in the postemergence tests. Results were observed 21 days after spraying in postemergence pre-emergence tests.

The effect of the herbicide was evaluated in terms of the injury rating index scale, ranging from 0 to 10 as follows:

0—No apparent injury
1,2,3—Slight injury
4,5,6—Moderate injury
7,8,9—Severe injury (plants will die)
10—Plants were dead An injury rating of 3 is the maximum tolerated for crops and a rating of 7 is the minimum acceptable on weed plants.

| | Injury rating | | | | | | | |
|---|---|---|---|---|---|---|---|---|
| | Preemergence | | | | Postemergence | | | |
| Plant | (1) | (2) | (3) | (4) | (1) | (2) | (3) | (4) |
| Corn | 0 | 0 | 0 | 0 | 0 | 0 | 0 | 0 |
| Yellow nutsedge | 10 | 8 | 7 | 5 | 10 | 9 | 1 | 1 |
| Mustard | 10 | 10 | 10 | 10 | 10 | 10 | 10 | 10 |
| Yellow foxtail | 10 | 10 | 9 | 8 | 10 | 10 | 5 | 5 |
| Barnyard grass | 10 | 9 | 3 | 2 | 10 | 10 | 10 | 10 |
| Crabgrass | 10 | 10 | 9 | 8 | 10 | 10 | 8 | 8 |
| Buckwheat | 10 | 10 | 10 | 10 | 10 | 10 | 10 | 10 |
| Morning glory | 10 | 10 | 10 | 10 | 10 | 10 | 10 | 10 |

[1] 10 pounds of active ingredient per acre.
[2] 5 pounds of active ingredient per acre.
[3] 2.5 pounds of active ingredient per acre.
[4] 1.25 pounds of active ingredient per acre.

We claim:
1. A triazine of the structure

$$R_3NH-C\underset{N}{\overset{N}{\underset{\|}{\diagup}}}\overset{}{\underset{C}{\diagdown}}C-Cl$$
$$\phantom{R_3NH-C}HNCH_2\overset{*}{N}\diagdown_{R_2}^{R_1}$$

wherein $R_1$ is a $C_1$ to $C_4$ alkane, phenyl or benzyl, $R_2$ is independently hydrogen, a $C_1$ to $C_4$ alkane, phenyl or benzyl, or $R_1$ and $R_2$ together with the $\overset{*}{N}$ form a $C_4$ or $C_5$ heterocyclic ring selected from the group consisting of pyrrolidine, piperidine and morpholine and wherein $R_3$ is a $C_1$ to $C_4$ alkyl radical.

2. The compound of claim 1 which is 2-isopropylamino-4-piperidinomethylamino-6-chloro-s-triazine.

3. The compound of claim 1 which is 2-isopropylamino - 4 - di-sec-butylaminomethylamino - 6 - chloro-s-triazine.

References Cited

UNITED STATES PATENTS 3,637,685    1/1972    D'Alelio          260—249.8

JOHN M. FORD, Primary Examiner

U.S. Cl. X.R.
260—247.5; 71—93